April 30, 1963 W. B. McCAIN 3,087,721
SIGNATURE GATHERING AND STITCHING MACHINE
Filed Feb. 15, 1960 10 Sheets-Sheet 1
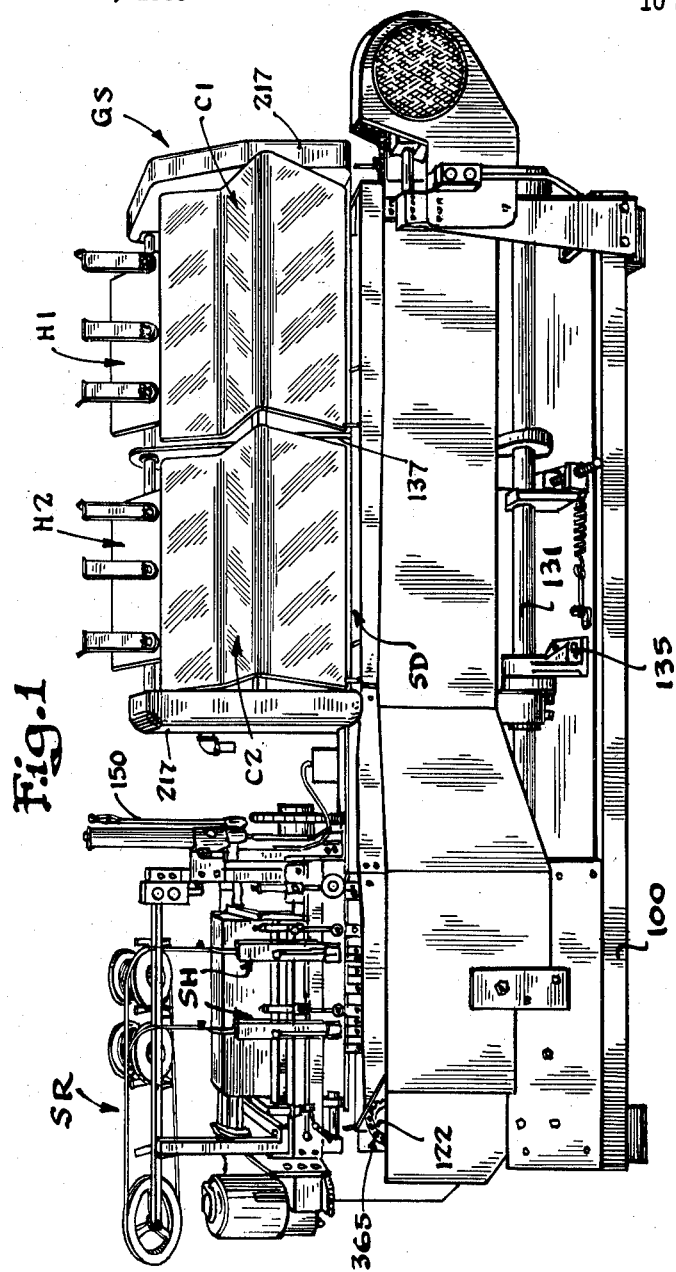
Inventor
William B. McCain
By Wallace and Cannon
Attorneys April 30, 1963     W. B. McCAIN     3,087,721
SIGNATURE GATHERING AND STITCHING MACHINE
Filed Feb. 15, 1960     10 Sheets-Sheet 2
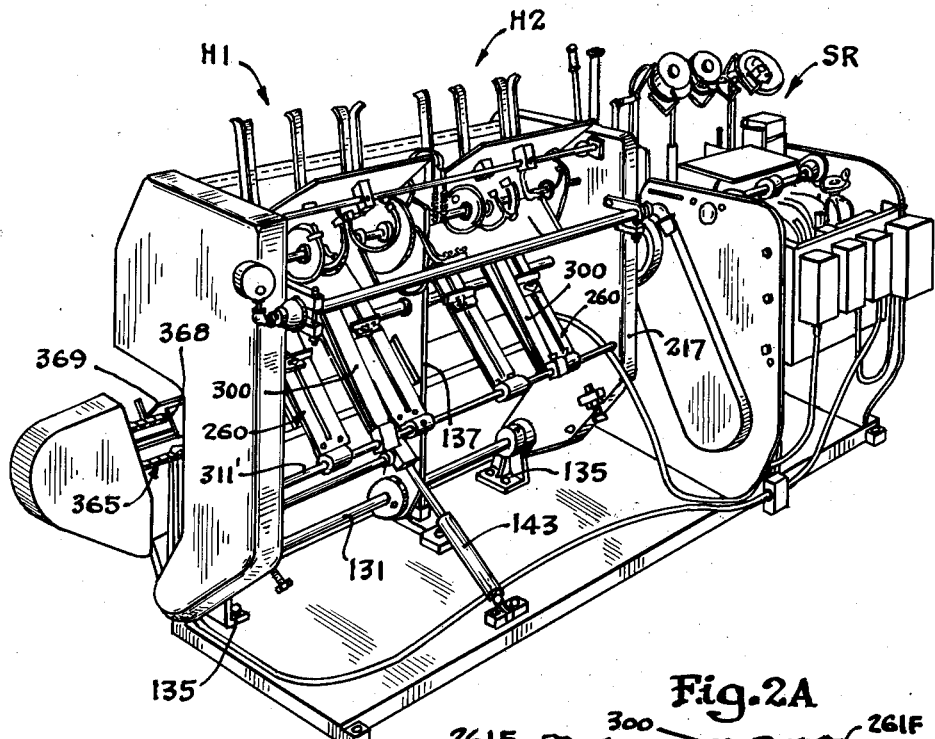
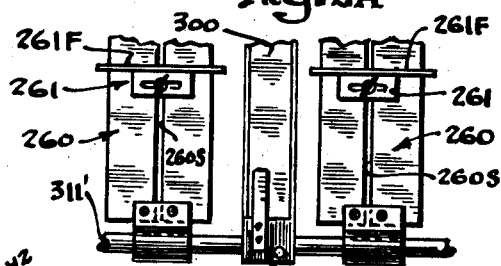
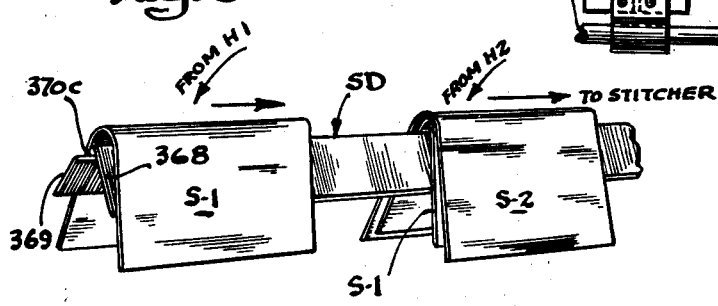
Inventor
William B. McCain
By Wallace and Cannon
Attorneys

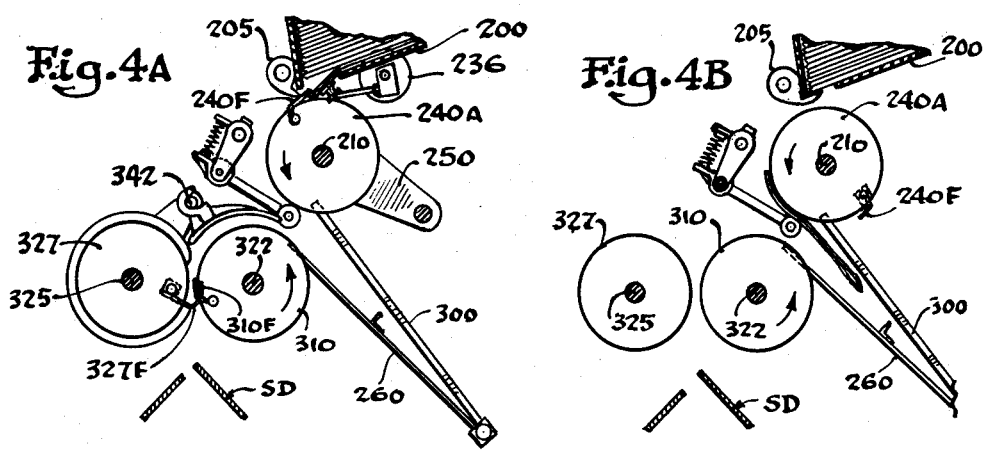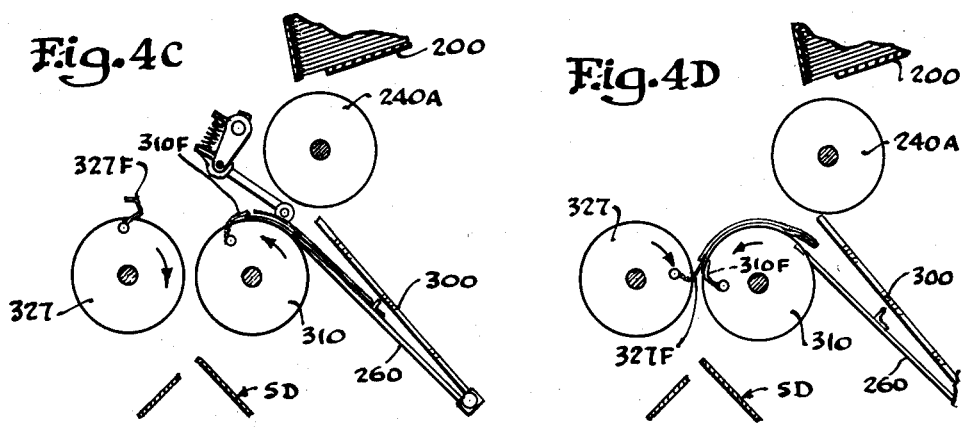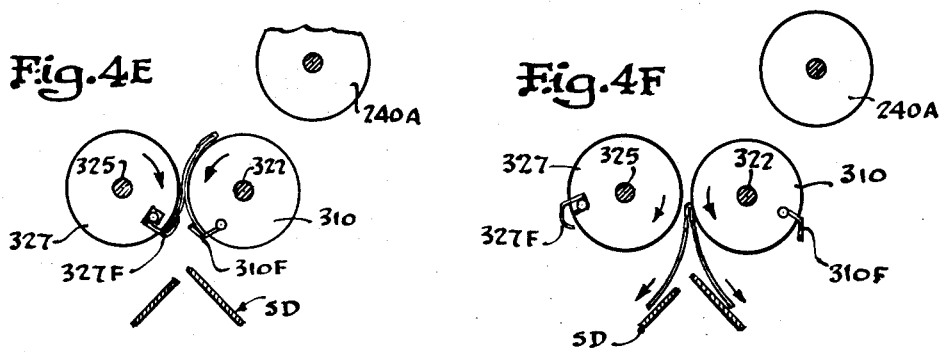

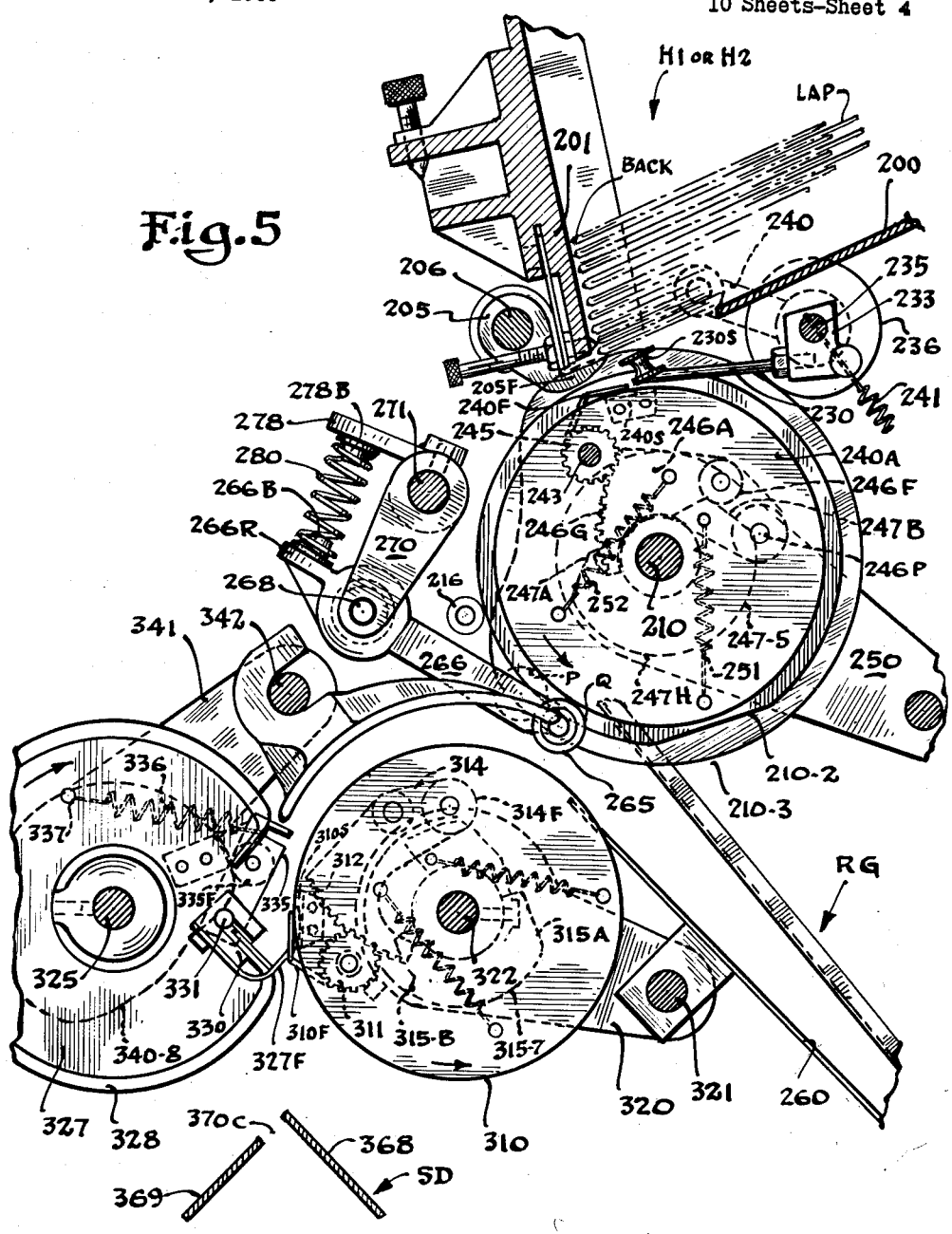

April 30, 1963  W. B. McCAIN  3,087,721
SIGNATURE GATHERING AND STITCHING MACHINE
Filed Feb. 15, 1960  10 Sheets-Sheet 5

Inventor
William B. McCain
By Wallace and Cannon
Attorneys

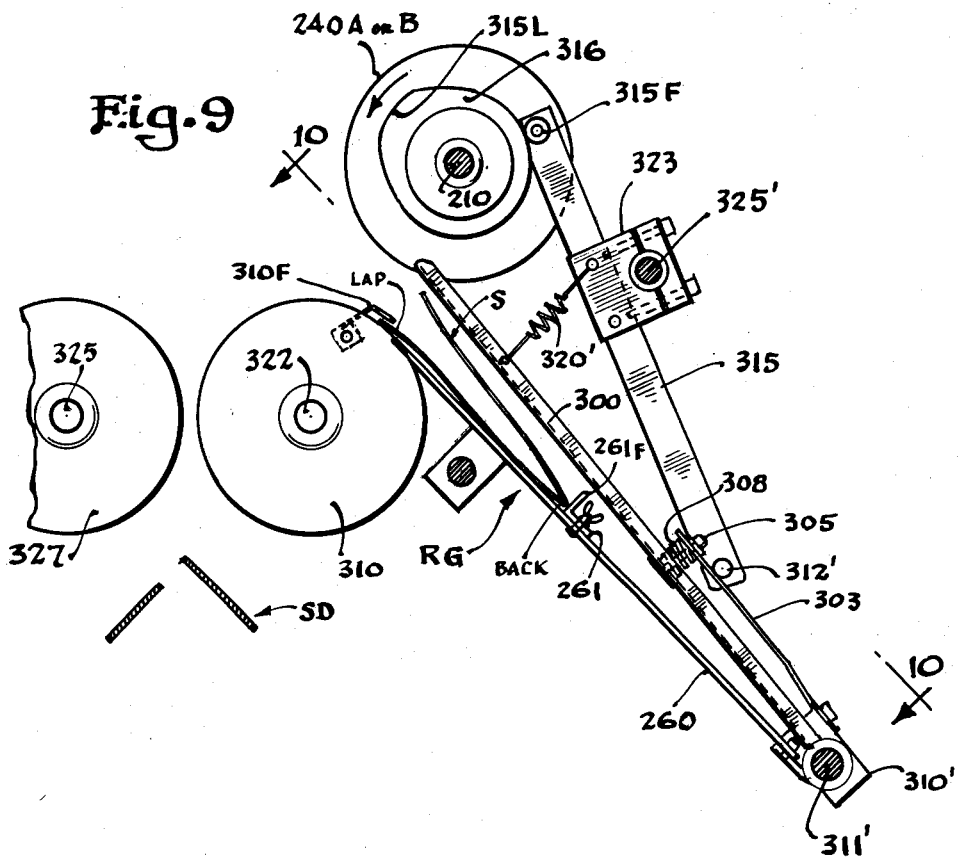
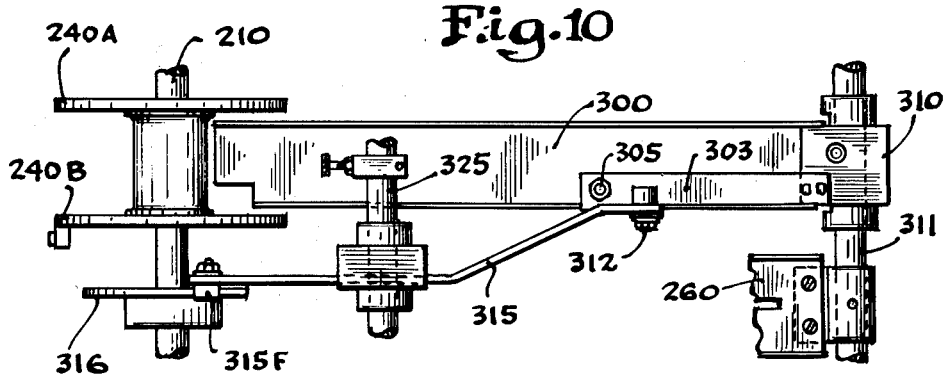

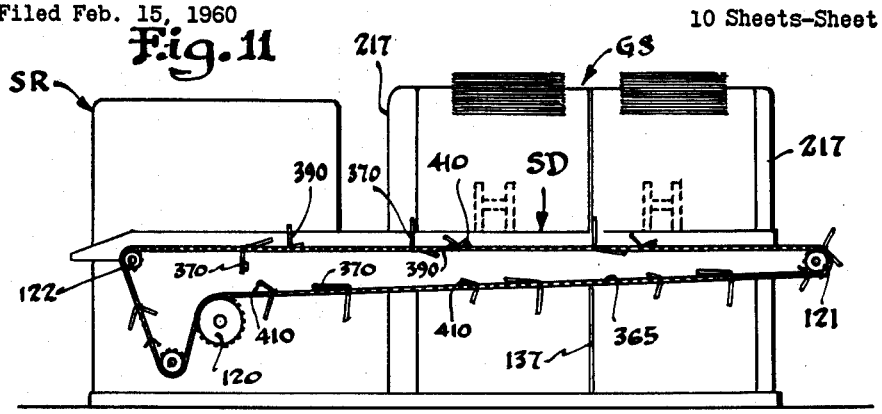
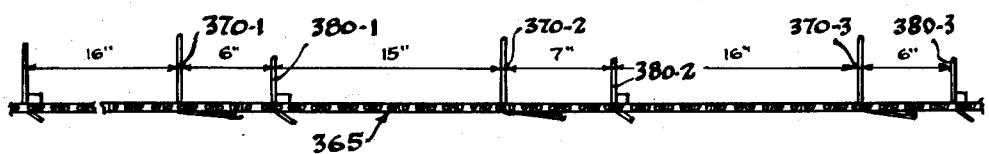
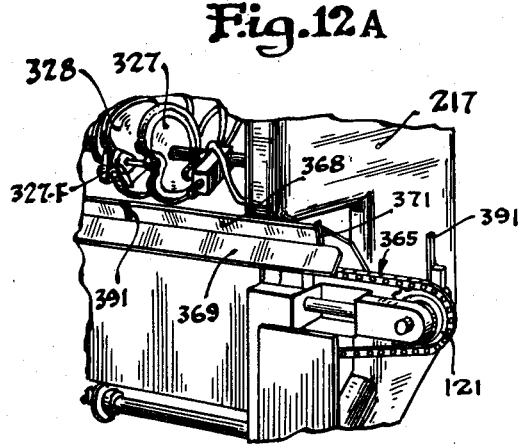
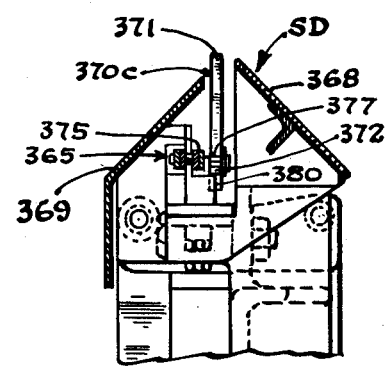

April 30, 1963 W. B. McCAIN 3,087,721
SIGNATURE GATHERING AND STITCHING MACHINE
Filed Feb. 15, 1960 10 Sheets-Sheet 8

Inventor
William B. McCain
By Wallace and Cannon
Attorneys

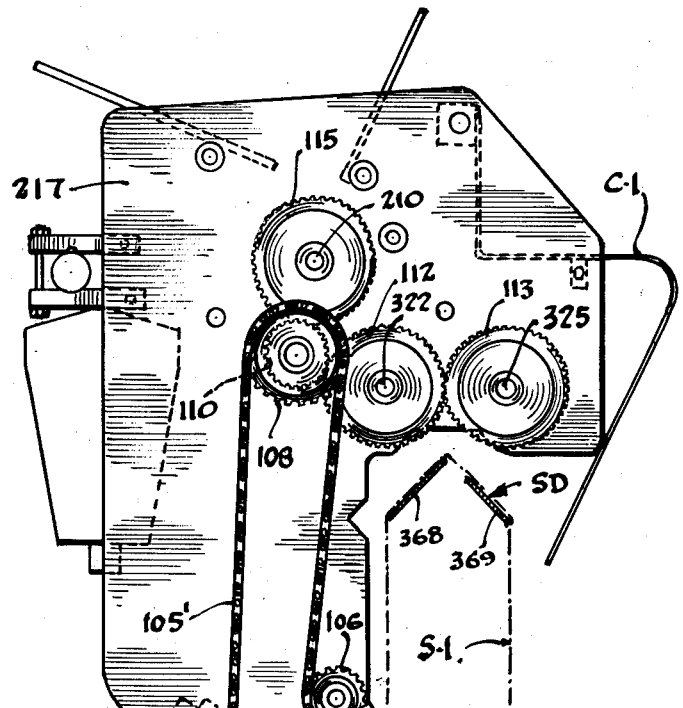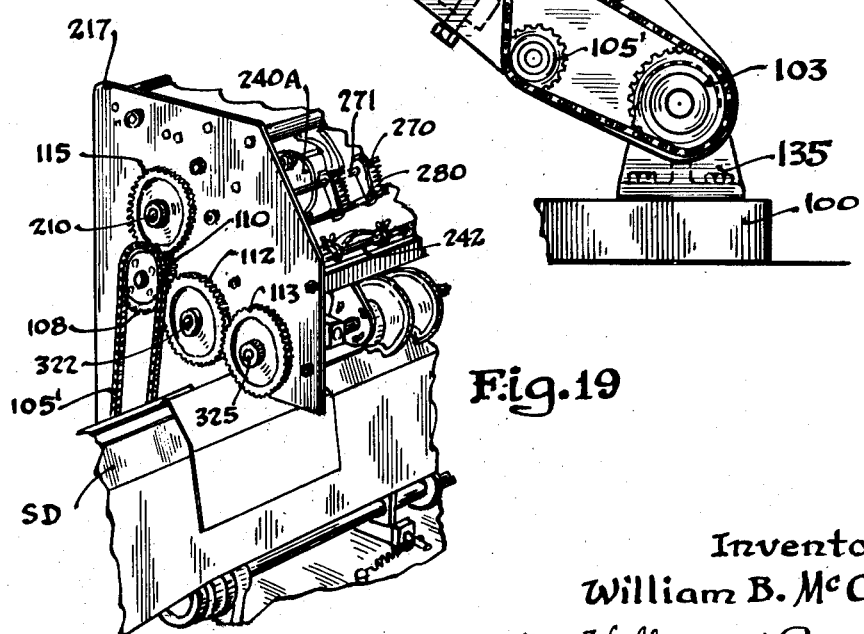

April 30, 1963 W. B. McCAIN 3,087,721
SIGNATURE GATHERING AND STITCHING MACHINE
Filed Feb. 15, 1960 10 Sheets-Sheet 10

Inventor
William B. McCain
By Wallace and Cannon
Attorneys

United States Patent Office 3,087,721
Patented Apr. 30, 1963

3,087,721
SIGNATURE GATHERING AND STITCHING
MACHINE
William B. McCain, Oak Park, Ill., assignor to Chicago Machinery Laboratory, Inc., Chicago, Ill., a corporation of Illinois
Filed Feb. 15, 1960, Ser. No. 8,629
10 Claims. (Cl. 270—54)

This invention relates to a machine for gathering signatures into booklet form and advancing the same to a stitching station where the signatures are stitched together to afford a book.

Machines of the kind to which the present invention relates are commonly employed in the production of books of relatively small size, that is, books such as television guides, rotogravure sections, small magazines and the like, wherein there are but a few signatures to be joined together. Machines of this kind are equipped with two or more supply hoppers from which signatures are individually fed and eventually arranged with respect to a conveyor to be conveyed in a juxtaposed condition to a stitching station where the same are joined by stapes or other fastening means. Machines of this kind are intended to operate at high speed conditions such that it is important to assure that misalignment of signatures does not occur, because otherwise the machine has to be stopped to correct the misalignment condition.

Feeding of the signatures has heretofore been facilitated by so folding the signature as to produce a lap margin on one of the sheets, that is, the end portion of one of the sheets extends beyond the end portion of the other sheet. This lap is to be gripped, and eventually the two sheets are to be spread into V-form prior to being associated with a conveyor mechanism used to advance the signatures to the stitching station. Such lap gripping accounts for high speed operation, but inasmuch as it sometimes happens that misalignment occurs during the course of transfer of the signature from the supply hopper to the conveyor, the primary object of the present invention is to interpose alignment mechanism in the signature feed equipment so as to assure that the lap of each signature is accurately oriented in an exposed position preliminary to the final feed operation wherein the signature is to be dropped on to the conveyor line. A related object of the present invention is to produce flattening of the signature at the stage where it undergoes alignment so that the possibility of a jam is greatly reduced. In other words, the present invention, as will be explained in detail hereinafter, enables signature gathering machines to be operated at a higher rate than heretofore, and this is made possible in accordance with the present invention by alleviating or diminishing possibilities of misalignment and jamming during the course of advancing a signature from its supply hopper to the conveyor mechanism. Another object of the present invention is to obtain greater contact with a signature during the opening of a signature by providing a signature opening roller or disc with a yieldable surface as will be explained hereinafter.

In those instances where the book is to be, let us say only of eight to sixteen pages, the staples that join the signatures account for a significant thickness, and this makes stacking difficult and awkward. This is due of course to the fact that the staples in the stack of books are aligned one atop another, and another object of the present invention is to produce stagger stitching in an advantageous manner such that the books can be stacked with the staples of one book misaligned with respect to immediately adjacent books. This, it will be recognized, enables higher stacks to be made without apprehension of the stack toppling, and also facilitates handling, packaging, and shipment since stacks of more uniform dimension are made possible. In other words, in contrast to a stack having a significant fan shape, the present invention makes possible a stack of signatures of more rectilineal shape.

Other and further objects of the present invention will be apparent from the following description and claims and are illustrated in the accompanying drawings which, by way of illustration, show preferred embodiments of the present invention and the principle thereof and what is now considered to be the best mode contemplated for applying this principle. Other embodiments of the invention embodying the same or equivalent principle may be used and structural changes may be made as desired by those skilled in the art without departing from the present invention and the purview of the appended claims.

In the drawings:

FIG. 1 is a perspective view of the front of a signature gathering and stitching machine constructed in accordance with the present invention;

FIG. 2 is a perspective view of the back of the machine;

FIG. 2A is a detail plan view of portions of the aligner gauges in the machine;

FIG. 3 is a detail perspective view showing the movement of signatures along the saddle track of the machine;

Figure 6:
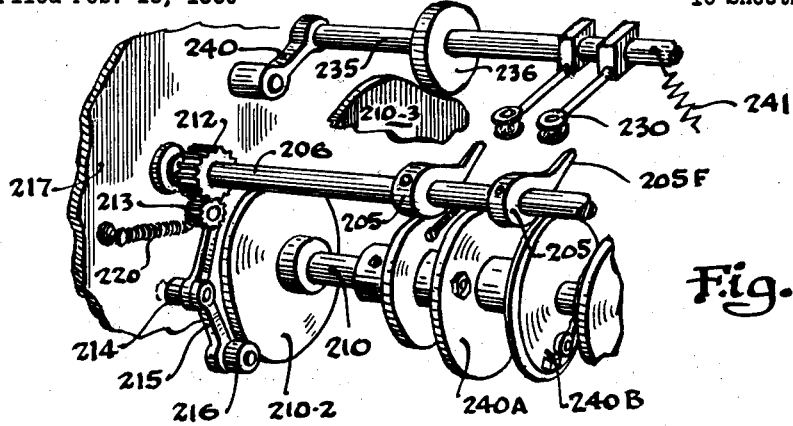
Figure 7:
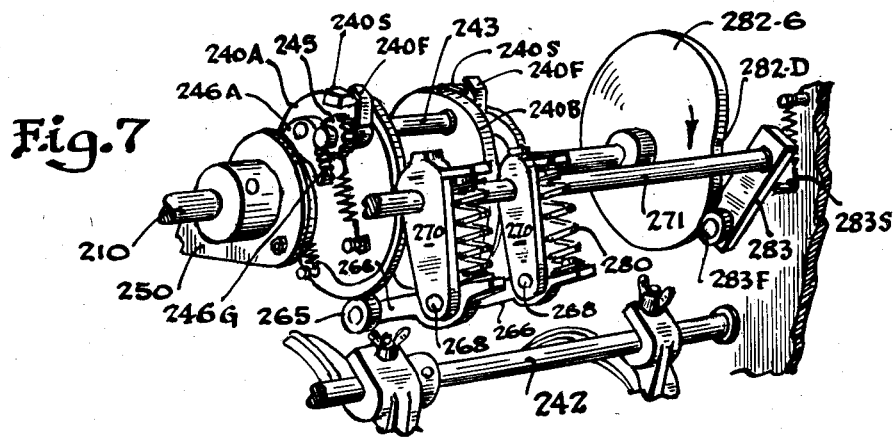
Figure 8:
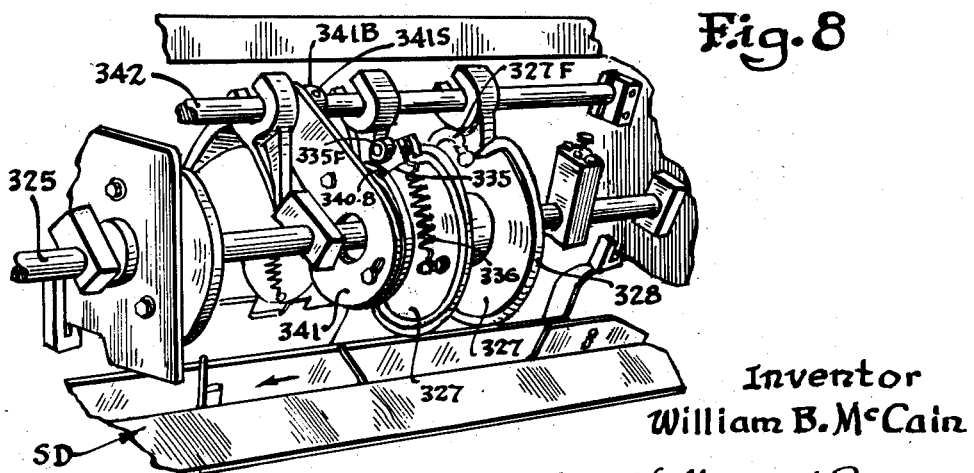
Figure 13:
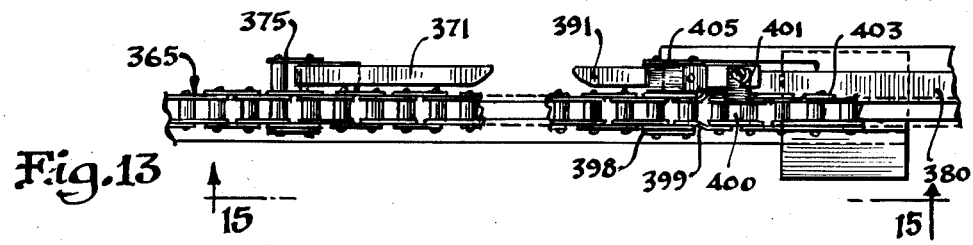
Figure 14:
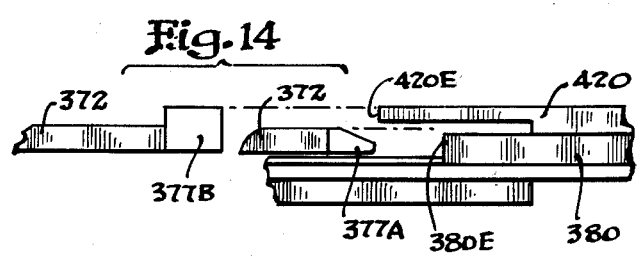
Figure 15:
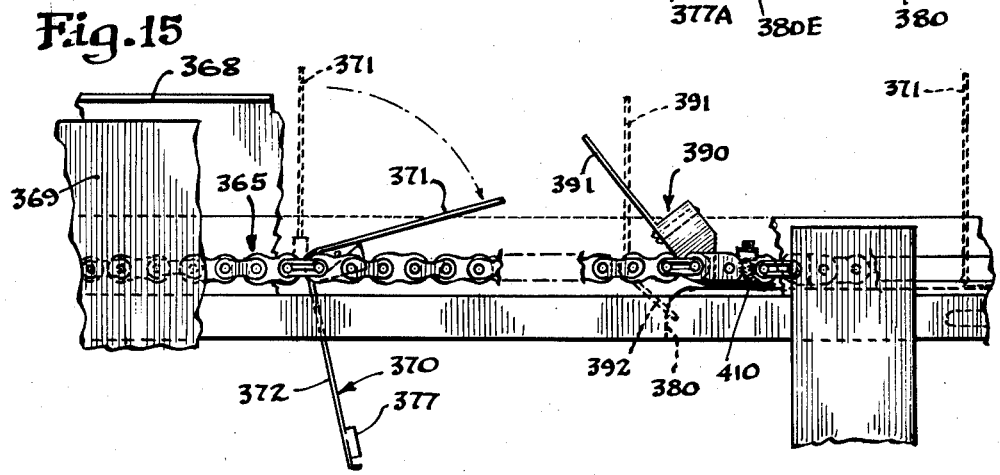
Figure 16:
Figure 17:
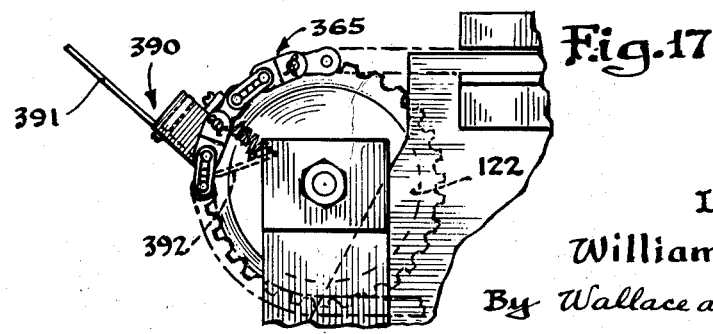
Figure 20:
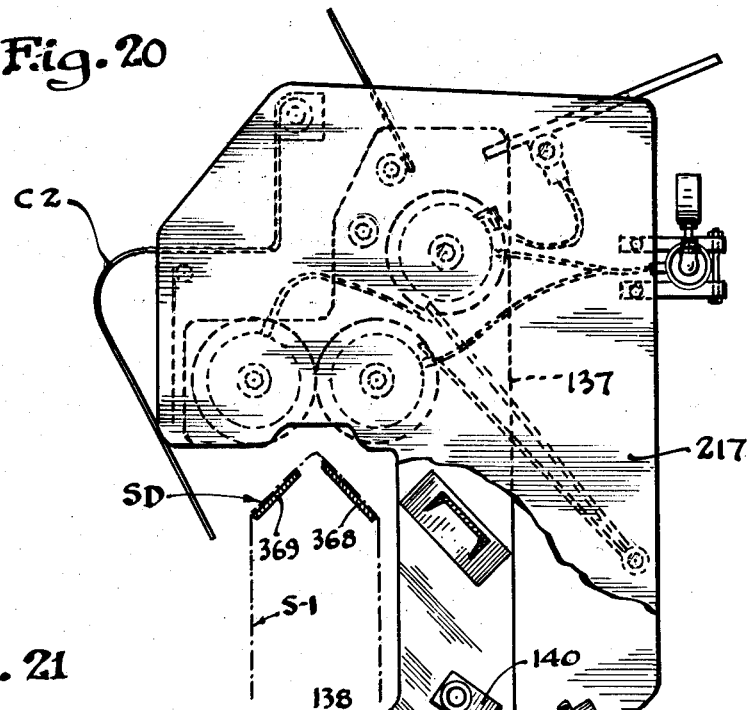

FIGS. 4A to 4F inclusive are schematic views illustrating various stages during the transfer feeding of a signature from its hopper to the sadle track;

FIG. 5 is a sectional view showing details of the feed means used to transfer a signature from its hopper to the saddle track;

FIGS. 6, 7 and 8 are detail perspective views showing more details of the parts appearing in FIG. 5;

FIG. 9 is a detail elevation of an aligner gauge and the associated page flattener;

FIG. 10 is a plan view taken on the line 10—10 of FIG. 9;

FIG. 11 is a schematic layout showing the relation of the conveyor chain to the signature gathering and stitching stations;

FIG. 11A is a plan of the spacing between feed fingers on the conveyor chain;

FIG. 12 is a transverse sectional view through the saddle track and showing the relation of the conveyor chain thereto;

FIG. 12A is a perspective view of the conveyor feed elements entering the signature gathering station;

FIG. 13 is a top plan view, partly broken away, of the conveyor chain and certain of the feed elements associated therewith;

FIG. 14 is a top plan view showing the relation between the feed finger guide rails and related parts of certain of the feed fingers;

FIG. 15 is a side elevation taken substantially on the line 15—15 of FIG. 13;

FIG. 16 is a detail plan view of a book feed element;

FIG. 17 is a view showing the condition of a book feed element in its raised or active position;

FIG. 18 is a side elevation at one side of the gathering station;

FIG. 19 is a detail perspective view showing certain of the gears used as drive elements;

FIG. 20 is a side elevation at the side of the gathering station opposite that shown in FIG. 18; and FIG. 12 is a detail perspective view at one end of the gathering station.

GENERAL DESCRIPTION AND DRIVE
CONNECTIONS

The machine of the present invention is illustrated in FIG. 1 as comprising, at the right-hand side as viewed in this figure, a pair of signature supply hoppers H1 and H2 which are partly hidden from view by a pair of raised cover plates C1 and C2 which, when lowered, cover feed discs and related parts constituting means by which signatures are removed individually from each related hopper. These signatures, as shown in FIG. 3, are deposited eventually in a spread state on a saddle conveyor track SD located at the front of the machine below the supply hoppers. A signature from supply hopper H1 will first be deposited on the saddle, whereafter this signature, as shown in FIG. 3, is advanced along the saddle toward hopper H2 where the second signature for the book is dropped on top of the first signature. As will be evident in FIG. 3, signatures on the saddle are in a spread state with the folded backs at the top of the saddle, and the signatures are advanced along the saddle track by feed elements of a first set carried by an endless chain 365, FIG. 11. These feed elements operate in a particular manner, as described hereinafter.

The foregoing describes generally parts that are located at what represents the signature gathering station of the machine identified generally at GS in FIG. 1. A group of signatures thus gathered into booklet form are moved as a unitary body along the saddle to the left as viewed in FIG. 1 toward the signature stitching apparatus SR, FIG. 1, and are deposited by the aforesaid feed elements in a stationary state beneath a pair of stapling heads SH identifying the location of the stitching station. It is here that staples or other fastening elements are passed through the backs of the signatures in a booklet group to complete the formation of the book.

The signatures are then advanced by another set of feed elements on the chain 365 to the left hand end of the machine where the signatures are collected and stacked. The equipment embodied in the stitcher mechanism SR constitutes no part of the present invention and hence details of this equipment will not be described herein. Rather, the present invention is concerned in part with means for feeding of the signatures from their supply hoppers, inversion of the signatures and alignment in an aligner gauge, withdrawal of each signature from its aligner gauge and the depositing of the same on the saddle SD. The present invention is also concerned with the mechanism used to advance the signatures along the saddle SD to the stitching station, and in particular feed mechanism and related parts for producing stagger stitching.

The various parts to be described hereinafter in connection with feeding the signatures to the saddle SD, and the conveyor mechanism associated with the saddle SD, are driven from a main drive motor (not shown). This motor drives a shaft (not shown) having a main drive sprocket 103, FIG. 18, affixed thereto. A chain 105 is trained around the sprocket 103 and over a pair of idler sprockets 105' and 106 which are located on a mounting plate 217, FIG. 18, at the left-hand side of the gathering station. The chain 105 is also trained around a driven sprocket 108, and the shaft which supports this sprocket also supports a main drive gear 110. This gear is meshed with a gear 112 as shown in FIG. 18, and the gear 112 in turn is meshed with a gear 113. The gears 112 and 113 are in a 1:1 ratio and are connected to the respective ends of a pair of shafts 322 and 325 so that the latter are driven in a 1:1 ratio.

The gear 110 also drives gear 115 which in turn is connected to the main cam shaft 210 of the machine. This shaft 210 and the shafts 322 and 325 extend longitudinally of the gathering station and are supported for rotation in bearings in turn mounted on a pair of main mounting and support plates, including plate 217, located at the left and right hand sides of the gathering station.

Figure 21:
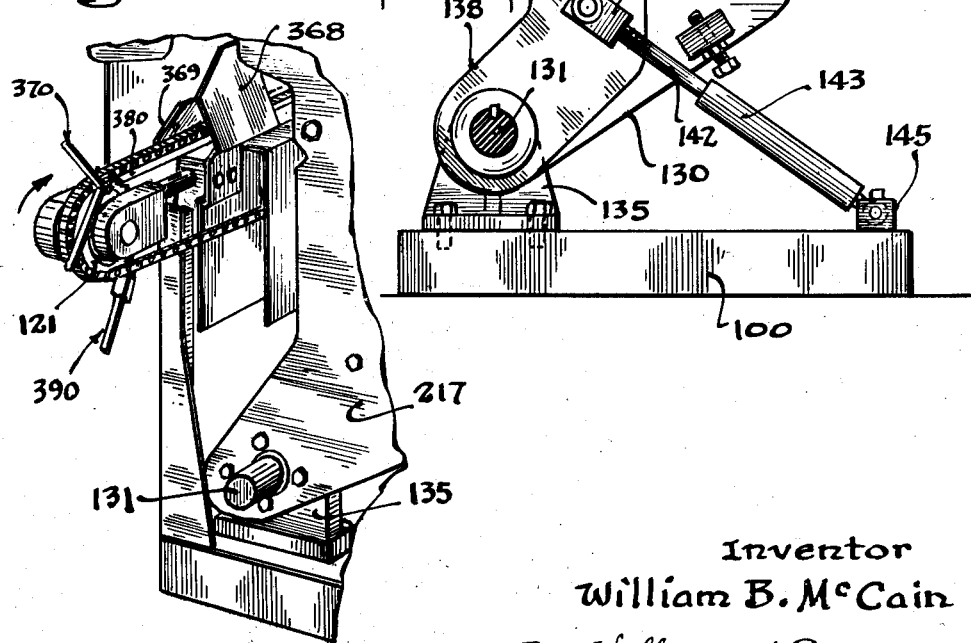

The conveyor chain 365 mentioned above, and aspects of which will be described in detail hereinbelow, is driven by a drive sprocket 120, FIG. 11. This chain is trained around an idler sprocket 121 which is positioned somewhat outboard of the gathering station as will be evident in FIGS. 11 and 21, and the chain 365 is also trained around an idler sprocket 122 located outboard of the stapling heads. The sprocket 120 for driving the chain 365 receives a drive transmitted from the drive motor.

As shown in FIGS. 18 and 20, the parts associated with the gathering station of the machine are cantilevered over the saddle SD. In order to enable hand feeding of exceptionally small signatures to be accomplished, the main mounting plates referred to above as located at the sides of the gathering station, and including the mounting plate 217, are formed with lower extensions 130, FIG. 20, that are pivotally mounted on a heavy mounting bar 131, FIGS. 1 and 20. The mounting bar 131 is supported by blocks as 135, and these in turn are bolted to the base 100 of the machine. An intermediate mounting and support plate 137, FIG. 20, is interposed between the end mounting plates as 217, and the shafts 210, 322 and 325 are rotatably supported at the upper portion of the intermediate mounting plate 137. The mounting plate 137 includes a bottom leg 138 which is also pivotally mounted on the support bar 131, and a block 140 is pivotally mounted on one side of the mounting plate 137.

A hydraulically actuated piston 142, FIG. 20, is threadedly connected to the block 140, and the cylinder 143 of this piston is pivotally connected to a stationary block 145 mounted at the rear of the base 100 of the machine.

Fluid pressure is adapted to be supplied to the cylinder 143 from a reservoir by a pump, and the operating handle for this pump is shown at 150 in FIG. 1. Hence by pumping fluid to the cylinder 143, or draining fluid therefrom, the entire gathering station as a unit can be rocked clockwise or counterclockwise as viewed in FIG. 20 to position the same relative to the saddle SD.

*Signature Gathering and Stitching*

Each of the supply hoppers from which the signatures are fed is identical in construction, operation and association with respect to signature feed and related parts, and hence the description of one alone will suffice.

Thus, the signatures S, FIG. 5, are stacked one upon another vertically, and the stack is supported by a bottom plate 200 of the related hopper H1 or H2. It will be observed in FIG. 5 that the bottom support plate 200 is downwardly inclined to impart a corresponding slope to a signature stacked thereon, and the signatures are so arranged within the hopper as to have the lap (that is, the extended marginal portion) of the bottom sheet in a rearward position. This locates the folded backs of the signatures adjacent a front stop 201 in position ultimately to be grabbed by a gripper means carried rotatably below the related signature hopper.

The signatures are normally held within the related hopper so as to be in an unreleased state, that is, not released to the action of the aforesaid gripper means, and such is afforded by a signature release means 205 which is carried on a rock shaft 206. The signature release means 205 has a lower end in the form of a release finger 205F which is normally positioned to apply a positive holding force to the weight of the signatures represented by at least the unsupported back extents thereof as will be evident in FIG. 5. As will be explained, the signature release means 205 is repeatedly oscillated to be shifted out of and into signature engaging position, and this is to occur in timed relation to downward pulling of the forward portion or back of a signature in the hopper and ultimate gripping of the back thereof.

Thus, and referring to FIGS. 5 and 6, the machine includes a driven cam shaft 210 which has a relatively large cam 210—2 affixed thereto for rotation therewith. The rock shaft 206, it will be noted, is located above and somewhat forwardly of the cam shaft 210. The rock shaft 206 carries a spur gear 212 at one end thereof, and this gear is engaged by a segment gear 213 carried on a bell crank or rocker arm 215 which is supported for rotation on a pin 214 supported in turn by one of the main support plates 217 of the machine which serve to support the bearings for the various shafts and related parts.

The arm of the bell crank 215 opposite that which carries the segment gear 213 rotatably supports a cam follower 216 which is associated with the cam 210—2. A spring 220 has one end anchored on a stud affixed to the aforesaid mounting plate 217, and the opposite end of this spring is fixed to a pin carried by the arm of the bell crank 215 having the segment gear 213 thereon. The spring 220 thus serves to hold the cam follower 216 in positive contact with its cam 210—2, and repeated rotation of the cam shaft 210 repeatedly presents the lobe and the dwell of this cam to the follower 216 causing repeated rocking of the bell crank 215 and, resultantly, oscillation of the signature releasing fingers 205F. The action of the cam 210—2 is accurately timed with respect to related signature feed operations to be described hereinafter, and such timing is determined by properly selecting gear ratios, dimensions, and cam configurations.

While various different arrangements can be resorted to incidental to positively withdrawing a signature from its hopper, it is preferred in accordance with the present invention that this be accomplished by signature pull-down arms 230, FIG. 5, having suction cups 230S at the forward ends thereof in position to apply suction to the lower-most one of the signatures in the related signature hopper. Thus, when a signature is to be withdrawn from the hopper in position to be engaged by the gripper means, the arms 230 are pulled down as viewed in FIG. 5, and the releasing fingers 205F are to be turned clockwise in the proper timed relationship.

The arms 230 are hollow and are connected to a source of vacuum in a manner that constitutes no part of the present invention. The forward hollow ends of the arms 230 have the suction cups 230S affixed thereto so that resultant suction can be applied to the folded back of the lower-most signature in the related hopper, and the opposite end of each arm 230 is fastened to a support block 233, FIG. 5, which in turn is secured to a mounting shaft 235. By raising and then lowering the mounting shaft 235 as viewed in FIG. 5, the suction cups will be oscillated and the lower-most signature will have the forward end thereof pulled downward upon application of suction so as to be in the path of gripper fingers as will be explained.

The mounting shaft 235 which supports the suction arms 230 carries a relatively large cam follower 236 which is associated with a cam 210—3 carried by the cam shaft 210 inwardly of or to the left of the cam 210—2 as viewed in FIG. 6. At this point it should be mentioned that the major extents of the peripheries of the cams 210—2 and 210—3 are high parts or lobes, and that the low parts or dwells, whereat the signature releasing and pull-down means 205 and 230 are effective, are of relatively short angular extent since the parts 205 and 230 are operated only at the time the signature gripping means is approaching and at the effective point of its travel. Thus, it will be noted in FIG. 5 that the dwell or low part of the cam 210—3 is approximately of 90° extent, and the dwell or low part of cam 210—2 is only about 30°.

The shaft 235 which carries the follower 236 is supported at its opposite ends by a pair of arms as 240, FIG. 6, that are pivotally mounted on related pins affixed to the mounting plate as 217, and a spring 241 has one end anchored to the shaft 235 and the opposite end thereof is connected to a stationary part of the machine rearward of the shaft 235 to thereby maintain the follower 236 constantly in engagement with its cam 210—3.

In accordance with the present invention, the signatures, with the folded back in a forward or leading position and with the lap sheet upper-most in each instance, are to be pulled around in a generally counterclockwise path as viewed in FIG. 5, reaching an inverted position with the lap sheet downward, and then are to be driven in a controlled fashion by a positively applied force onto an aligner plate which is part of a so-called register gauge. While associated with the aligner plate, the signature thus inverted is jostled or joggled to assure that the two sheets thereof are completely flattened to facilitate further feeding, whereafter other gripper means are then effective to grasp or hold the exposed signature lap and to withdraw the signature thus aligned from the register gauge.

A pair of discs 240A and 240B, FIG. 6, are located beneath the related signature supply hopper, and these discs are arranged in spaced relation on and are fixed to the cam shaft 210 so as to rotate therewith. These discs and associated parts are identical in construction and action, and hence disc 240A is alone shown in FIG. 5. An eccentrically located rock shaft 243 is extended between the two discs as shown in FIG. 7, and a pair of gripper fingers 240F are secured to the rock shaft 243 for rocking motion therewith. Each gripper finger 240F is positioned to tightly press on a related gripper shoe 240S affixed to a related disc. As shown in FIGS. 5 and 7, the rock shaft 243 has a spur gear 245 fixed to one end thereof, and this gear, as will be explained immediately below, is effective to rotate the rock shaft 243 to urge the fingers 240F toward their gripper shoes 240S to tightly hold therebetween the folded back of a signature.

Rocking motion of shaft 243 is induced by a segment gear 246G, FIG. 5, which is part of a segment gear rocker arm 246A, the latter being pivotally mounted at 246P, FIG. 5, to the side of the disc 240A on which the spur gear 245 is located. Thus, the arm 246A which has the segment gear associated therewith is free to rock on a pivot carried by the disc 240A, and when so rocked will impart rotary motion to the gear 245 to thereby rock the gripper fingers 240F.

Pivotal action is imparted to the arm 246A by stationary cam means relative to which the disc 240A rotates. Thus, the arm 246A rotatably carries a follower 246F, FIG. 5, intermediate the pivot 246P and the segment gear formation 246G. The follower 246F is located to follow the contour of a C-shaped segment cam 247—5 which is supported in a fixed position by a stationary arm 250. Springs 251 and 252 have ends anchored to pins on the arm 246A, and the opposite ends of these springs are likewise anchored to the disc 240A to thereby urge the cam follower against the cam 247—5.

The cam 247—5 has a surface 247H, FIG. 5, of constant radius of curvature, and this arc extends for substantially 180°. The surface 247H terminates at inwardly sloped flat surfaces 247A and 247B. The follower 246F, FIG. 5, travels counter-clockwise as viewed in FIG. 5, and as it moves from the end of the surface 247H on to surface 247B, this occurs substantially as the open fingers 240F pass approximately midway of the suction arm 230. The gripper fingers 240F thus are open the maximum extent so long as the follower 246F is on surface 247H of cam 247—5, and when thus open the fingers 240F are radially inward of the periphery of the associated disc 240A, and hence will clear the signature pulled down by the suction members 230S.

However, as the follower 246F passes beyond the end of surface 247H of cam 247—5 and onto the flat chordal portion 247B thereof, FIG. 5, the fingers 240F close quickly on the folded back of a signature to hold the signature in contact with the shoes 240S carried by discs 240A and 240B. The suction cups as 230S are valved to vent to the atmosphere just as the gripper fingers are effective to grab the back of a signature released from the supply hopper, and accordingly the signature is freed to the pulling action of the gripper fingers 240F.

The signature is thus pulled around with the discs 240A and 240B in a counter-clockwise direction as viewed in FIG. 5, and as shown schematically in FIG. 4A, this gradually inverts the signature so that the lap sheet becomes bottom-most as will be apparent from FIG. 4B. The signature thus withdrawn from the supply hopper is to be directed into a register gauge RG, FIG. 5, whereat the signature will be properly positioned for the next feeding operation performed thereon. There is a register gauge for each signature hopper, and each such gauge is inclusive of a pair of spaced aligner plates 260, FIGS. 2, 2A and 5, disposed to lie in an inclined plane which slopes downwardly and rearwardly away from each disc as 240A as viewed in FIG. 5. An adjustable stop is associated with each pair of plates 260 so as to enable the signature fed thereto to have the lap edge thereof projecting freely over and beyond the upper edges of the paired plates 260 as viewed in FIGS. 5 and 9. Thus, each plate 260 is slitted longitudinally at 260S, FIGS. 2 and 2A, and slidable back stops 261 are arranged transverse to these slits. Each stop 261 has a flange 261F resting on the associated aligner plate 260, and a screw is passed therethrough and through the slit 260S. A wing nut WK is threaded onto the screw, and the relationship is such that by loosening the wing nut the back stop can be positioned as desired and then held in place by tightening the wing nut.

In order that the signatures will be properly positioned in the register gauges, means are afforded in the present instance for driving the signatures with a positive feed action into the register gauge while assuring that each signature will have the lap properly positioned relative to the forward or upper edge of the aligner plates 260. Such positive feed action, together with support of the signature during the in-feeding operation into the register gauge, is afforded by a pair of feed rollers 265, FIGS. 5 and 7, each of which is disposed to engage a related one of the discs 240A and 240B. Moreover, each feed roller is spring urged into contact with the related disc; and hence will be driven by the disc and will also be driven or rotated during the in-feeding of a signature as will be apparent from the description to follow.

The feed rollers 265 are supported for free rotation by arms 266. The arms 266 in reality are in the nature of levers and each is pivoted as at 268, FIG. 5, to the lower end of a feed roller drive arm 270. Each drive arm 270 is pinned to a rock shaft 271, and referring to FIG. 7 it will be noted that this rock shaft is disposed to extend parallel to the cam shaft 210.

In order that the rollers 265 will be urged positively into contact with the related discs, arm 266 in each instance is formed with a rearward extension 266R, FIG. 5, and a mounting boss 266B is formed on the upper surface of the extension 266R. An arm 278 is supported in fixed position above the extension 266R, and this arm also includes a boss 278B. A coil spring 280 has the open ends fitted over the bosses 266B and 278B, and this coil spring is normally effective to urge the related arm 266 in a counterclockwise direction as viewed in FIG. 5 to hold the related feed roller 265 in contact with the peripheral surface of the related disc as 240A or 240B.

The feed rollers 265 are adapted to shift between points P and Q shown in FIG. 5, these being points of contact of the rollers 265 with the related disc 240A or 240B. As a signature is pulled around by the gripper fingers 240F, the feed rollers 265 are disposed at contact point P, and as the signature is pulled beyond point P, the signature will then be disposed between the rollers 265 and the related discs 240A and 240B. At point P, the signature is aligned with the throat of the register gauge RG.

Cam 247—5 is so configured that as the follower 246F is approximately midway of the surface 247A thereof, the gripper fingers 240F commence effectively to open, and this occurs once the folded back of a signature has passed beyond point P and has proceeded toward point Q. At this time the feed rollers 265, which are rubber surfaced, are effective to support the signature, but it is now desired that the signature be directed with a positive action into the register gauge, and this is attained by imparting a positive drive to the arms 266 in a right-hand or register-gauge direction as viewed in FIG. 5. Thus, and referring now to FIG. 7, a cam 282—6 is affixed to the cam shaft 210 so as to rotate therewith. This cam has a relatively short dwell 282–D. A control arm 283 is affixed to the rock shaft 271 and carries a follower 283F which is urged into contact with cam 282—6 by a spring 283S, FIG. 7. When the dwell 282–D is presented to the follower 283F, FIG. 7, it will be seen that rock shaft 271 will be rocked clockwise as viewed in this figure due to the action of spring 283S, and this is equivalent to a forward feed stroke of the roller supporting arms 266 causing the rollers 265 to move from point P to point Q. This is a relatively swift spring-induced action, and it will be recognized that the dwell 282–D is of relatively short duration.

Thus, as the cam follower 283F moves "inward" in following the cam dwell 282–D, arms 266 advance the feed rollers 265 from points P to points Q, and the converse takes place as the follower 283F gradually moves outward of the dwell 282–D on to the prolonged high part or lobe of cam 282—6. The dwell area 282–D is so configured as to assure that there will be a slight pause of the rollers 265 at their points Q, and this pause is sufficient to impart a slowing down action to the signature moving into the register gauge so that when the signature is finally freed of the discs 240A and 240B it will not "bounce" against the back stop 261. Thus, if there is excessive "bounce" of the signature on the aligner plate 260, there will be no assurance that the lap will be properly positioned at the front or upper edge of the aligner plate 260.

The next operation performed on the signature is to withdraw the same from the aligner plate and to separate the two sheets thereof. This sequence is illustrated in FIGS. 4C to 4F inclusive. To therefore assure that the signatures come to rest in a perfectly flat state on the aligner plates 260, means are afforded to flatten the signatures, and such means includes a flattener plate 300, FIGS. 2A and 9, which is located between and normally spaced above a pair of the aligner plates 260 and cooperates with the latter in affording the aforementioned throat of the register gauge. Thus, after a signature has been fed on to a pair of the aligner plates 260, the associated flattener 300 for that particular register gauge is to be moved quickly and forcefully toward the aligner plates 260, as viewed in FIG. 9, to assure that the signature S will have the upper leaf thereof lying flat on the lower leaf. Each such flattener plate 300 is supported primarily by a leaf spring 303 having one end telescoped over a stud 305 which in turn is connected to the flattener plate 300. Surrounding the shank of the stud 305 and interposed between the plates 303 and 300 is a coil spring 308 which is interposed as a safety device to provide yielding in the event several signatures should accidently bulk up in the signature gauge to more than ¼" thickness. Thus, motion is imparted to the flattener plate 300 through the conjoint action of springs 303 and 308 as a yieldable interconnection. The end of the leaf spring 303 opposite the stud 305 is connected to a block 310' at the back of the machine, and this block in turn is supported by a stationary shaft 311' at the back of the machine as will be particularly evident in FIG. 2.

Motion is imparted to the leaf spring 303 by a presser roller 312' carried at the lower end of an upwardly directed arm 315, and the opposite end of this arm carries a cam follower 315F associated with a cam 316 carried by the cam shaft 210. The follower 315F is normally held in engagement with the cam 316 by a spring 320' which has one end secured to the flattener plate 300 and the other end secured to a pin or block 323 which pivotally supports the arm 315 on a stationary mounting shaft 325'. The shaft 325' extends parallel to the cam shaft 210 and is located somewhat rearwardly of and below the cam shaft 210.

Signatures are withdrawn from each aligner gauge by means which grasp the lap of the lower sheet of the signature on the associated aligner plates. Additionally, the sheets or leaves of the signature are thereafter spread into a V-form, dropped on to a track in the form of a saddle SD, and the signature is advanced along the track or saddle SD by a conveyor means to a stitching station, and it will be appreciated that ultimately there will be at least two signatures on the saddle one atop the other before a signature reaches the stitching station. Such means includes a pair of discs generally indicated at 310 in FIG. 5, each of which is spaced from and paired with one of the discs 240A and 240B. Each disc as 310 carries a gripper finger 310F which operates in the manner described above in connection with the gripper fingers 240F. Thus each gripper finger 310F is carried by a spur gear 311 driven by a segment gear 312, the latter being carried on an arm 314. The gear 311 and the arm 314 are supported for turning motion on a pin carried by the disc 310, and the arm 314 has a follower 314F which is under control of a C-shaped cam 315—7 having surfaces to be referred to specifically hereinafter. Cam 315—7 in turn is supported on a stationary shaft 321 relative to which the discs 310 turn.

The discs 310 are carried on a driven shaft 322, and spaced opposite the shaft 322 and in parallel horizontal alignment therewith is a driven shaft 325 which has a pair of discs 327, FIGS. 5 and 8, fixed thereto so as to be driven with the shaft 325. The discs 310 have solid metallic surfaces, but the discs 327 have hollow rubber tubes 328 extended about the periphery thereof, and the ends of these tubes are held in a flattened state against cut-out shoulders as 330 afforded by in effect notching the discs 327. The size of the tubes 328 and the spacing of the outer surfaces thereof relative to the unyielding peripheries of the discs 310 is such that the outer surfaces of the tubes 328 will press resiliently against the solid peripheries of discs 310 in order to assure that a signature in a spread state is properly positioned on the saddle track SD in a manner to be explained.

One of the discs 327 carries an opening finger 327F, and this finger is fastened to a block 330 which in turn is clamped to a rock shaft 331 extending between and supported by the discs 327 for rotation relative thereto. An operating arm 335 is clamped to the rock shaft 331, and this arm is urged in a counter-clockwise direction as viewed in FIG. 5 by a coil spring 336, the coil spring having one end anchored in a notch in the end of arm 335 opposite the shaft 331, and the opposite end of the spring 336 is anchored to a pin 337 carried by one of the discs 327. A cam follower 335F is rotatably mounted on the arm 335 intermediate the ends thereof, FIGS. 5 and 8, and the spring 336 is effective to hold this follower in contact with a cam 340—8 supported by a stationary arm 341. As best shown in FIG. 8, the arm 341 has a relatively large opening therein which surrounds the driven shaft 325, and the opposite or upper end of this arm has a boss 341B secured to a mounting shaft 342 as by a set screw 341S. Such showing also demonstrates the manner in which the arms 250 and 320 are supported in the machine.

The relationship of the fingers 310F and 327F is shown in FIG. 5, noting that the discs 327 rotate clockwise while the discs 310 rotate counter-clockwise. Now, if the discs 310 and 327 be envisioned as turned about 90° from the position shown in FIG. 5 so that the fingers 310F and 327F are at the "top" of their discs, the fingers 310F under this condition would be just clamping the lap only (see FIG. 4D) of a signature against the related shoes 310S carried by the discs 310. Then, as the discs 310 continue to rotate counter-clockwise, the fingers 310F continue to be carried around counter-clockwise and continue to hold the lap end of the signature against the related shoes 310S as will be apparent from FIGS. 4C to 4E inclusive and this condition is maintained until the discs 310 have turned about 135° from the position shown in FIG. 5. In the meantime, the discs 327 are rotating clockwise from the FIG. 4C position to the FIG. 5 position, and the follower 335F eventually passes on to the relatively long dwell or flat portion of the cam 340—8, FIG. 5. The discs 327 are located inside the spacing between the discs 310 and therefore, as the follower 335F travels along the dwell of cam 340—8, the opening finger 327F is rocked counter-clockwise as viewed in FIG. 5 and enter in between the sheets or leaves of the signature that is being held tightly by the fingers 310F as shown in FIG. 4E. Consequently, the sheets or leaves of the signature commence spreading apart as shown in FIGS. 4E and 4F, and during such spreading apart the tubes 328 engage the signature and hold it firmly against the solid peripheries of the disc 310 whereby the signature when released by the fingers 310F will be forcefully fed down by the feed bight now established between the engaged facing surfaces of the discs 310 and 327. Eventually the follower 314F rides off the surface 315–B of cam 315—7 thereby causing the fingers 310F to open, that is, they move away from the shoes 310S, releasing the signature. As this occurs, FIG. 4F, the signature is already free of finger 327F, and the signature drops onto the saddle SD. The fingers 310F remain open as they travel along the "high" part of cam 315—7 which lies between surfaces 315–B and 315–A thereof, whereafter this follower then travels on cam surface 315–A producing closing movement of the fingers 310F and the resultant grasping of the exposed lap of the next signature lying on the related aligner plates 260, this being evident from a comparison of FIGS. 4F and 4C.

The foregoing describes the manner in which the signatures are lap fed from their individual supply hoppers, inverted, properly gauged for the next lap feed, and then lap fed in such a manner as to be dropped on to the saddle SD with the leaves of each signature spread apart. There are two hoppers H1 and H2 as indicated in FIGS. 1 and 2, and it should be pointed out in connection with FIG. 1 that the signature feed parts associated with each hopper are adapted to be covered by transparent cover plates C1 and C2 which are in a raised position illustrated in FIG. 1 for properly revealing the same.

The individual signatures thus removed from the related supply hoppers and dropped on to the saddle SD, are to be gathered into groups of two on the saddle, and this particular station of the machine is referred to herein as the gathering station indicated by the reference character GS in FIG. 1. The saddle SD, as shown in FIG. 11, extends lengthwise of the machine from the gathering station all the way to and past the stitcher mechanism generally indicated by the reference character SR in FIGS. 1 and 11, and the stitcher mechanism (of a known kind) is provided with two laterally adjustable stapling heads SH identifying what is referred to herein as the stitching station. Since the stitcher mechanism is of a known kind, it suffices to point out generally that stitching wire is fed from a supply reel down into the stapling heads SH which are positioned above related stapling anvils and over which the signature groups are to be stationarily located so that the several signatures affording each book will be stapled together in the usual fashion. It will be realized that each signature itself comprises several pages depending upon the extent to which the signature has been folded.

In gathering the signatures and in conveying these to the stitching station, resort is had to a continuous feed band that runs beneath the stationary track afforded by the saddle SD, and feed fingers of two different kinds are carried by the feed band. The saddle, as will be particularly evident in FIG. 5, is spread so as to have a back plate 368 and a front plate 369. These plates are arranged in generally inverted V-shape with the apex disposed upwardly, but the upper edge of the front plate 369 terminates short of the upper edge of the back plate 368 so as to afford a longitudinally extending channel 370C, FIGS. 3 and 5, and the feed fingers mentioned above move with the band directly in alignment with this channel so as to be erectable to engage the rear or trailing edge of a signature group.

The conveyor band is in the form of a chain 365, FIG. 15, parts of which will be described below in connection with the mounting of the feed fingers thereon, and this chain is trained over sprockets as described in connection with FIG. 11. One of these is a drive sprocket in turn driven by means including bevel gears (not shown) driven by the main drive motor of the machine. The bevel gears are so selected and a gear box (not shown) is interposed in the drive system, to produce the desired timing of the conveyor belt or band represented by the chain 365. Gears can be arranged to correspondingly alter the rate of movement of the chain 365 so that it will be assured that the signature S-1, FIG. 3, fed from the hopper H1 will first be dropped on to the saddle and then advanced along the stationary saddle to a position immediately opposite hopper H2 where a signature S-2 is to be dropped thereover to afford the booklet or signature group ultimately to be stapled. The two signatures thus in unstitched booket form are then advanced to the stitching station, maintained stationary at the stitching station to enable stapling to be effected, and the completed book is then fed from the stitching station to a collecting table, whereafter the pages are cut as may be necessary and the signatures arranged in a stack. Inasmuch as staples can impart a significant thickness to each booklet, the present machine is so constructed as to account for stagger stitching as will be now described.

A signature as S-1 dropped on to the saddle from hopper H1 is advanced forwardly to receive the next signature as S-2 by a feed finger 370, FIG. 15, and each such feed finger as 370 is in the form of a bell crank having an erectable signature-engaging finger 371 and a leg 372 joined thereto at right angles. The erect position is illustrated in dotted lines in FIG. 15, and the upper end of the feed finger 371 is adapted to project upwardly through the channel 370C as will be particularly evident in FIG. 12, and in this position will be so disposed as to engage the trailing edge of a signature as S-1, FIG. 3.

The chain 365 for the most part is constructed from standard roller links. Each member 370 is pivotally connected to the chain 365. This is accomplished by interposing in the chain a straight lug link plate 375, FIG. 13, off-set to lie on the inside of the chain 365, that is, the side of the chain that is disposed toward the back plate of the saddle as shown in FIG. 12. The feed member 370 is spot welded or otherwise connected to one of the pivot rollers of the link plate 375 so as to be free to swing. The leg 372 of each feed member 370 is provided at the end opposite the pivot with a lateral extension or lug 377, FIG. 15, but it may here be pointed out that for stagger stitching this extension or lug 377 will alternately be of the size 377A or 377B, FIG. 14, and the reason for this will be pointed out hereinbelow.

In any event, the conveyor mechanism in the present instance is so constructed as to assure that the feed fingers 371, which advance the signature groups forwardly from the gathering station to the signature stitching station, will be dropped to an ineffective or inoperative position once a group of signatures has reached the stitching station whereat the stapling heads are located. This is accomplished under the present invention by associating a rail or supporting member 380, FIGS. 13 to 15 and 21, with the laterally extended lugs carried by the legs of the feed elements 370, and this rail is of such an extent as to have one end, FIG. 21, located near the sprocket 121, FIG. 11, where the conveyor chain 365 turns from its lower to its upper pass to carry the signature advancing elements 370 through the gathering station. The opposite end 380E of the rail 380, FIG. 15, terminates short of the stitching station, and this opposite end 380E of the rail is so located that as a narrow lug 377A passes therefrom the corresponding feed member 370 is free to drop and pivot clockwise, whereupon the signature group that was being advanced thereby is positioned accurately in a stationary state underneath the stapling heads. The particular signature feed or advancing member 370 shown in FIG. 15 has moved beyond this position and has already been dropped to its ineffective position so as to pass freely beneath a signature group at the stitching station, but the dashed arrow in FIG. 15 illustrates the motion involved. The stapling heads and associated parts are adjustable for signatures of different sizes and to enable the stapling station to be oriented with respect to the dropping point of the fingers 371.

As the feed elements 370 are carried upward by the conveyor chain just prior to arriving at the right hand end of the gathering station as viewed in FIG. 11, these are biased to an upward or effective position because it is here that the legs 372 of these feeder elements first commence to engage the rail 380. Hence as the feeder elements 370 move through the gathering station the fingers 371 are in an upright position in the channel 370C, FIG. 12, and engage and forcefully move the signatures along the saddle until the opposite or drop off end of the rail 380 is encountered adjacent the stitching station.

Alternating along the feed elements 370 having the feeder fingers 371 are feed elements 390 constituting a second set of feed members. These feed elements or members in the second set have fingers 391, which, as shown in FIG. 15, are normally in a dropped or ineffective position throughout the extent of the rail 380. In other words, the feed elements 390 have nothing to do with advancing signatures to the stitching station, and the fingers 391 thereof, while traversing the gathering station, move below what constitutes the apex or folded back of a signature on the portion of the saddle SD coextensive with the gathering station. Each of the feed elements 390 as mentioned, includes a feed finger 391, and each such feed element is of bell crank form so as to have a leg 392 in position to travel along the top of the rail 380. The feed members 390 are pivotally associated with the chain 365, and this is accomplished by making the following connections. Referring to FIG. 13 double strand connecting links 398 are interposed in the standard chain links, and this portion of the chain is joined by off-set connecting links 399 to a standard roller link 400 which is equipped with a bent lug 401. The portion of the chain next to the right of the lug 401 as viewed in FIG. 13, includes a standard connecting link and next an off-set connecting link 403 which is joined to the standard chain construction. Thus, the chain is of standard construction except in the area where the feed members are interposed.

A standard straight lug link plate 405 is connected in off-set relation to the inside of the chain 365, that is, the side that is adjacent the rail 380, and the feed members 390 are pivotally mounted thereon. A coil spring 410, FIG. 16, has one end fastened to the upper side of the leg 392 of each feed member 390, and the opposite end of this spring bears on the underside of the fixed lug 401 carried by the chain. Thus, the spring 410 normally tends to urge each feed member 390 in a clockwise direction as viewed in FIG. 15, but so long as a leg 392 is riding on the rail 380, the associated feed member 390 cannot be so turned. However, as the leg 392 passes off the end of the rail 380 prior to reaching the stapling station where a stationary and stapled signature group is located, the spring 410 is then free to expand and hence the associated feed finger 391 moves from the dropped or ineffective full line to the effective upright dotted line position illustrated in FIG. 15. This finger 391 is thus erect in the saddle channel and is in position to advance a stapled book out of the stitching station to the end of the saddle where it is collected with the others that have previously been stapled.

In accordance with the present invention, the machine can be modified at will to produce stagger stitching of the kind discussed hereinabove, and this is made possible by having resort to an adjustable rail 420, FIGS. 13 and 14, which is located adjacent the inside face of the fixed rail 380. The lugs 377A and 377B are alternately affixed to the trailing ends of altenrate ones of the feed members 370. The different sized lugs or ears 377A and 377B are of no significance unless stagger stitching is to be used. In this connection, attention is directed to FIG. 11A showing the plan for spacing the feed elements associated with the chain 365. It will be noted that a leading feed element 370 has been identified as 370—1. In actual practice a spring-biased feed element 380—1 for feeding a book is spaced six inches rearward from the feed element 370—1 which is to feed a signature group. Spaced fifteen inches from feed element 380—1 is a second signature group feed element 370—2 followed by a second book feed element 380—2 spaced seven inches therefrom, and then a third signature group feed element 370—3 is spaced sixteen inches rearward of the feed element 380—2 followed by a book feed element 380—3 spaced six inches therefrom. It will be noted that this spacing of the feed elements results in a one-inch difference in the spacing between successive ones of the feed elements 370. If stagger stitching is not to be utilized in the manner hereinafter explained, then the plan set forth in FIG. 11A will simply result in non-staggered stitching, since the end of the rail 380, where the signature group feed fingers 371 are dropped and where the book feed fingers 391 are raised, is in effect a fixed and determined location in the machine.

It will be noted in FIGS. 13 and 14 that the end 420E of the rail 420 projects beyond the corresponding end 380E of the rail 380, and this identifies the machine as set up for stagger stitching. Both ends 380E and 420E of these rails terminate well prior to the stitching station. A feed element 370 equipped with a narrow lug or ear 377A will deposit its signature in position to be stapled as the lug 377A passes off the end 380E of the rail 380. On the other hand, assuming that the end 420E of the rail 420 projects say an inch beyond the end 380E of rail 380, and assuming that alternate ones of the feed elements 370 are equipped with wide ears 377B engageable with the rail 420, then it follows that a group of signatures being advanced by this finger 370 so equipped with a wide lug or ear will deposit its signature in effect one inch ahead of the previous signature group, thereby accounting for stagger stitching among the two groups of signatures thus considered. If stagger stitching is not to be used then rail 420 is retracted so that its end 420E at best is aligned with the end 380E of rail 380. It will be appreciated that the rail 420 need not have the length of rail 380, since the lug 377B spans the width of both rails. Of course staggering up to one inch can be provided for.

*Conclusion*

The present invention enables signatures to be fed and gathered at a relatively high speed inasmuch as the manner in which these are positioned with accuracy and then flattened in the aligner gauge assures that the lap of an aligned and flattened signature is in accurate position for the final lap feeding operation, and inasmuch as the top page of the aligned signature has been flattened the possibility of a jam is substantially minimized. Moreover, the compressible nature of the periphery of feed discs 327 assures rather wide contact with the signature that is to be positioned on the saddle, and hence positioning of a signature on the saddle is more than a mere chance drop. Mechanical grippers have been herein illustrated as the gripper means by which the signatures are withdrawn from the supply magazine and from the aligner gauge, but alternatively the gripper means can be based on a vacuum or suction principle.

The feeding of signatures to the stitching station is a forcing action as distinguished from friction feed. Thus, the feed fingers 371 forcibly engage the trailing edge of the signatures so as to push the signatures toward the stitching station, and this results in a substantially simplified mode of signature feeding, which is also true of the feed fingers 391 which move the books out of the stitching station. By having resort to feed fingers, it is possible to accommodate stagger stitching in a relatively simple fashion merely by resorting to pivotal parts on the signature feeders that are so sized as to have a portion engageable with respective rails, one of which rails is adjustable to locate its terminal end at a point different from that of the terminal end of the remaining rail, and these terminal ends of the rails in effect represent the different points whereat the signature feed fingers 371 are rendered ineffective. It should also be pointed out in this connection that the book feeder fingers 391 are depressed just prior to entering the channel 370C of the saddle, and this enables signatures of relatively large dimensions to be handled without apprehension of interference by the feed fingers 391 which are used only to advance books out of the stitching station. The portion of a feed finger engageable with the adjustable rail can merely be a lug or ear as has been described, but the entire leg 372 can be of this width if desired, and spring elements can also be resorted to in this regard.

Hence, while the preferred embodiments of the present invention have been illustrated and described herein, it will be recognized that these are capable of variation and modification, and I therefore do not wish to be limited to the precise details set forth, but desire to avail myself of such changes and alterations as fall within the purview of the following claims.

I claim:

1. In a signature feeding machine, means affording a supply magazine in which the signatures are to be stacked each with a folded back thereof forwardmost and with an extended marginal lap thereof in an upwardly disposed position, a first rotatable member movable in a predetermined arcuate path and located beneath the magazine, said member having gripper means associated therewith for gripping the back of a signature to withdraw the signature from the magazine and to pull the same around in an arcuate path with the member thereby inverting the signature, means affording a substantially planar aligner plate disposed in an inclined plane beneath said member, means for rendering the gripper means effective at a first position near the top of the path of travel of said member to so grip the back of a signature and effective at a second position near the bottom of the path of travel of said member to release the inverted signature, a feed roller disposed adjacent said second position, an arm supporting said roller and means to bias the roller forcefully into pressure contact with an inverted signature on said member, means to drive said arm toward said aligner plate to drive a released signature on to the aligner plate with a forced action, stop means associated with said aligner plate to position the signature thereon with its marginal lap in position to be gripped, another rotatable member beneath the aligner plate and having gripper means associated therewith effective to grip the marginal lap of a signature on said plate and withdraw the same therefrom, and means to spread the leaves of a signature withdrawn from said plate preliminary to dropping the signature on a saddle-type conveyor.

2. In a signature feeding machine, means affording a supply magazine in which the signatures are to be stacked each with a folded back thereof forwardmost and with an extended marginal lap thereof in an upwardly disposed position, a first rotatable member movable in a predetermined arcuate path and located beneath the magazine, said member having gripper means associated therewith for gripping the back of a signature to withdraw the signature from the magazine and to pull the same around in an arcuate path with the member thereby inverting the signature, means affording a substantially planar aligner plate disposed in an inclined plane beneath said member, means for rendering the gripper means effective at a first position near the top of the path of travel of said member to so grip the back of a signature and effective at a second position near the bottom of the path of travel of said member to release the inverted signature, a feed roller disposed adjacent said second position, an arm supporting said roller and means to bias the roller forcefully into pressure contact with an inverted signature on said member, and means to drive said arm toward said aligner plate to drive a released signature on to the aligner plate with a forced action.

3. In a signature feeding machine, means affording a supply magazine in which the signatures are to be stacked each with a folded back thereof forwardmost and with an extended marginal lap thereof in an upwardly disposed position, a first rotatable member movable in a predetermined arcuate path and located beneath the magazine, said member having gripper means associated therewith for gripping the back of a signature to withdraw the signature from the magazine and to pull the same around in an arcuate path with the member thereby inverting the signature, means affording a substantially planar aligner plate disposed in an inclined plane beneath said member, means for rendering the gripper means effective at a first position near the top of the path of travel of said member to so grip the back of a signature and effective at a second position near the bottom of the path of travel of said member to release an inverted signature, a feed roller disposed adjacent said second position, a reciprocal arm supporting said roller and means to bias the roller forcefully into pressure contact with an inverted signature on said member, means to drive said arm toward said aligner plate through a predetermined forward stroke to drive a released signature on to the aligner with a forced action, the last-named means being effective to produce a pause of said arm at the end of its predetermined forward stroke, and means to flatten a signature on the aligner plate.

4. In a signature feeding machine, means affording a supply magazine in which the signatures are to be stacked each with a folded back thereof forwardmost and with an extended marginal lap thereof in an upwardly disposed position, a first rotatable member movable in a predetermined arcuate path and located beneath the magazine, said member having gripper means associated therewith for gripping the back of a signature to withdraw the signature from the magazine and to pull the same around in an arcuate path with the member thereby inverting the signature, means affording a substantially planar aligner plate disposed in an inclined plane beneath said member, means for rendering the gripper means effective at a first position near the top of the path of travel of said member to so grip the back of a signature and effective at a second position near the bottom of the path of travel of said member to release the inverted signature, a feed roller engageable with an inverted signature on said member adjacent said second position, an arm supporting said roller and means to bias the roller forcefully into pressure contact with an inverted signature on said member, means to drive said arm toward said aligner plate to drive a released signature on to the aligner plate with a forced action, a pair of rotatable members beneath said aligner plate and disposed adjacent one another to define a bight, gripper means on one of said paired members to withdraw a signature from off the aligner plate and into said bight, the other of said paired members having a sheet spreader thereon effective to cooperate with the last-named gripper means in spreading the sheets of the signature, one of said paired members having an unyielding surface and the other of said paired members having a flattenable resilient surface engageable therewith.

5. In a signature feeding machine wherein a signature in a substantially flat state and having an extended marginal lap on one sheet is to be withdrawn from one station and deposited in a spread state at another station, a first pair of spaced rotatable discs presenting unyielding outer peripheral surfaces and a second pair of laterally spaced rotatable discs presenting yieldable hollow tube surfaces extended about portions of the outer peripheral surfaces thereof and engageable with the first-named surfaces, cam-operated gripper means associated with one of the pair of discs effective to grip the lap of the signature to pull the signature around with that pair of discs, and cam-operated sheet spreader means associated with the other pair of discs to enter between the sheets of a signature so gripped and spread the same apart.

6. In a signature feeding machine wherein a signature in a substantially flat state and having a folded back and an extended marginal lap on one sheet is to be withdrawn from a magazine, deposited on an aligner plate in a flat state, and then withdrawn from the aligner plate and deposited in a spread state at another station, means including rotatable discs and cam operable grippers thereon disposed adjacent and below the magazine, cam means for closing the grippers on the discs incidental to gripping the back of a signature in the magazine and for opening the grippers to release the signature thus gripped, an aligner plate adjacent the releasing point of the grippers and onto which the signature is to be deposited in an inverted state with its back in a leading position, idler rollers mounted for shifting movement adjacent said releasing point and being biased into contact with said discs, means to shift said rollers in the direction of the aligner plate while biased as aforesaid to forcefully guide a released signature onto the aligner plate, a first pair of spaced rotatable discs below the aligner plate and presenting unyielding outer surfaces, a second pair of spaced rotatable discs defining a bight with the first-named pair and presenting yieldable surfaces engageable with the first-named surfaces, gripper means on the first pair of discs effective to grip the lap of the signature on the aligner plate and thereupon pull the signature around with said first pair of discs with the back of the signature in a trailing position, and sheet spreader means associated with the other pair of discs to enter between the sheets of a signature so gripped and spread the same apart.

7. In a signature feeding machine wherein a signature in a substantially flat state and having a folded back and an extended marginal lap on one sheet is to be withdrawn from a magazine, deposited on an aligner plate in a flat state, and then withdrawn from the aligner plate and deposited in a spread state at another station, means including rotatable discs and cam operable grippers thereon disposed adjacent and below the magazine, cam means for closing the grippers on the discs incidental to gripping the back of a signature in the magazine and for opening the grippers to release the signature thus gripped, an aligner plate adjacent the releasing point of the grippers and onto which the signature is to be deposited in an inverted state with its back in a leading position, idler rollers mounted for shifting movement adjacent said releasing point and being biased into contact with said discs, means to shift said rollers in the direction of the aligner plate while biased as aforesaid to forcefully guide a released signature onto the aligner plate, an osciliatable flattener plate disposed above the aligner plate and effective to press the top sheet of a signature on the aligner plate to thereby flatten the signature on the aligner plate, a first pair of spaced rotatable discs below the aligner plate and presenting unyielding outer surfaces, a second pair of spaced rotatable discs defining a bight with the first-named pair and presenting yieldable surfaces engageable with the first-named surfaces, gripper means on the first pair of discs effective to grip the lap of the flattened signature on the aligner plate and thereupon pull the signature around with said first pair of discs with the back of the signature in a trailing position, and sheet spreader means associated with the other pair of discs to enter between the sheets of a signature so gripped and spread the same apart.

8. In a machine of the kind described wherein individual signatures are to be withdrawn from a supply magazine, inverted and then opened: means to withdraw the signatures one by one from the supply magazine and to invert the signatures, a downwardly inclined aligner plate disposed adjacent said signature withdrawing means and onto which an inverted signature is to be downwardly fed, means to withdraw upwardly an inverted signature from said aligner plate, and a vertically oscillatable plate juxtaposed over the aligner plate and effective in a downward action toward a signature on the aligner plate to flatten the upper page of the signature on said aligner plate prior to withdrawal of the signature therefrom.

9. In a machine of the kind described wherein individual signatures are to be withdrawn from a supply magazine, inverted and then opened: means including gripper means on rotatable discs to engage and withdraw the signatures one by one from the supply magazine and to invert the signatures, means to release the gripper means after a signature has ben inverted, an aligner plate disposed adjacent said signature withdrawing means and onto which an inverted signature is to be fed, a feed roller engageable with a released and inverted signature to feed such a signature with a positive force on to the aligner plate, means to withdraw an inverted signature from said aligner plate, and an oscillatable flattener spaced above the aligner plate to flatten the upper page of a signature on said aligner plate.

10. In a signature feeding machine wherein a signature in a substantially flat state and having an extended marginal lap on one sheet is to be withdrawn from one station and deposited in a spread state at another station, a first pair of spaced rotatable discs presenting unyielding outer peripheral surfaces and a second pair of laterally spaced rotatable discs presenting resilient surfaces extended about portions of the outer peripheral surfaces thereof and engagable with the first-named surfaces, cam-operated gripper means associated with one of the pair of discs effective to grip the lap of the signature to pull the signature around with that pair of discs, and cam-operated sheet spreader means associated with the other pair of discs to enter between the sheets of a signature so gripped and spread the same apart.

References Cited in the file of this patent
UNITED STATES PATENTS

| | | |
|---|---|---|
| 588,794 | Granger | Aug. 24, 1897 |
| 1,140,734 | Christensen | May 25, 1915 |
| 1,211,846 | Holder | Jan. 9, 1917 |
| 1,236,181 | Kast | Aug. 7, 1917 |
| 1,601,802 | Kast | Oct. 5, 1926 |
| 2,251,943 | Kleineberg | Aug. 12, 1941 |
| 2,267,134 | Post | Dec. 23, 1941 |
| 2,845,264 | Faeber | July 29, 1958 |